(12) United States Patent
Arzberger

(10) Patent No.: US 12,540,982 B2
(45) Date of Patent: *Feb. 3, 2026

(54) METHODS AND SYSTEMS FOR DETERMINING A CAPACITY LOSS OF A BATTERY STORAGE DEVICE

(71) Applicant: Siemens Aktiengesellschaft, Munich (DE)

(72) Inventor: Arno Arzberger, Stegaurach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 205 days.

This patent is subject to a terminal disclaimer.

(21) Appl. No.: 18/551,445

(22) PCT Filed: Feb. 11, 2022

(86) PCT No.: PCT/EP2022/053363
§ 371 (c)(1),
(2) Date: Sep. 20, 2023

(87) PCT Pub. No.: WO2022/199933
PCT Pub. Date: Sep. 29, 2022

(65) Prior Publication Data
US 2024/0168097 A1 May 23, 2024

(30) Foreign Application Priority Data
Mar. 23, 2021 (EP) .................................... 21164160

(51) Int. Cl.
*G01R 31/382* (2019.01)
*H02J 7/00* (2006.01)

(52) U.S. Cl.
CPC .......... *G01R 31/382* (2019.01); *H02J 7/0048* (2020.01); *H02J 7/005* (2020.01)

(58) Field of Classification Search
None
See application file for complete search history.

(56) References Cited

U.S. PATENT DOCUMENTS 11,946,978 B2 * 4/2024 Arzberger ............. H02J 7/0048
12,253,571 B2 * 3/2025 Arzberger ............ G01R 31/389
(Continued)

FOREIGN PATENT DOCUMENTS

JP 09257890 A 10/1997 ............... B60L 11/18
JP 2000131403 A 5/2000 ............. G01R 31/36
(Continued)

OTHER PUBLICATIONS

Japanese Office Action, Application No. 2023557817, 9 pages, Dec. 10, 2024.
(Continued)

*Primary Examiner* — Jas A Sanghera
(74) *Attorney, Agent, or Firm* — Slayden Grubert Beard PLLC

(57) ABSTRACT

Various embodiments of the teachings herein include a method for ascertaining at least one average capacity loss of a battery storage device. The method may include: measuring at least two load cycles of the battery storage device using a high precision coulometry apparatus; determining a first charge displacement and a second charge displacement; determining a capacity loss equal to the difference between the first charge displacement and the second charge displacement; repeatedly measuring load cycles until the capacity loss is almost constant in at least two consecutive load cycles; and ascertaining an average capacity loss based on at least two capacity losses.

13 Claims, 3 Drawing Sheets

(56) References Cited

U.S. PATENT DOCUMENTS

| | | | |
|---|---|---|---|
| 2002/0144160 A1 | 10/2002 | Odaohhara et al. | 713/300 |
| 2004/0220758 A1 | 11/2004 | Barsoukov et al. | 702/63 |
| 2012/0169288 A1 | 7/2012 | Ueki et al. | 320/134 |
| 2014/0232411 A1 | 8/2014 | Vaidya | 324/426 |
| 2016/0003917 A1 | 1/2016 | You | G01R 31/36 |
| 2016/0084784 A1 | 3/2016 | Rajagopalan et al. | 324/693 |
| 2018/0149709 A1 | 5/2018 | Jo | G01R 31/36 |
| 2021/0148986 A1 | 5/2021 | Dong et al. | |

FOREIGN PATENT DOCUMENTS

| | | | | |
|---|---|---|---|---|
| JP | 2000295775 A | 10/2000 | | B60L 3/00 |
| JP | 2001283929 A | 10/2001 | | G06F 1/20 |
| JP | 2016513241 A | 6/2016 | | G01N 27/06 |
| WO | 2011/036760 A1 | 3/2011 | | G01R 31/36 |

OTHER PUBLICATIONS

Search Report for International Application No. PCT/EP2022/053363, 12 pages, Jun. 14, 2022.
Yanzhi Wang et al., "Minimizing state-of-health degradation in hybrid electrical energy storage systems with arbitrary source and load profiles" 2014 Design, Automation & Test in Europe Conference & Exhibition, Mar. 24, 2014.

* cited by examiner

METHODS AND SYSTEMS FOR DETERMINING A CAPACITY LOSS OF A BATTERY STORAGE DEVICE

CROSS-REFERENCE TO RELATED APPLICATIONS

This application is a U.S. National Stage Application of International Application No. PCT/EP2022/053363 filed Feb. 11, 2022, which designates the United States of America, and claims priority to EP Application No. 21164160.0 filed Mar. 23, 2021, the contents of which are hereby incorporated by reference in their entirety.

TECHNICAL FIELD

The present disclosure relates to batteries. Various embodiments of the teachings herein include systems and/or methods for determining a capacity loss of a battery storage device.

BACKGROUND

Lithium-ion accumulators, hereinafter also referred to as lithium-ion batteries, are used as energy storage devices in mobile and stationary applications due to their high power and energy density. In order to be able to operate these electrochemical energy storage devices safely, reliably and free of maintenance for as long as possible, the most accurate knowledge possible of critical operating states is required, in particular with regard to the state of charge and with regard to the state of health.

It is known that the aging of a battery, in particular so-called cyclical aging, can be adversely affected by high temperatures, rapid charging at low temperatures, depending on the state of charge and the depth of discharge and the charging capacity and discharge capacity. It is thus possible that the same type of battery cell can achieve a large different number of load cycles depending on the parameters mentioned.

To determine the expected aging process, in the prior art, an aging characteristic of the battery cell used is determined by means of measurements during the design phase of a battery system. The actual aging rate with actual load profiles is often not tested. Rather, the aging rate, or the cycle stability, of compressed load profiles is determined in so-called gathering tests. With these results, empirical aging models are parameterized, from which the course of aging in the application is evident. A course of future aging determined on the basis of physical and/or chemical measurements as a function of the load profile, the working point and the ambient conditions is difficult to carry out due to the non-linearity of the underlying physical and chemical processes and their complex interactions.

Predicting the state of health of a battery is often complex. Often, the parameterization of a meaningful aging model is therefore disadvantageously very time-consuming. Furthermore, assumptions must often be made to evaluate aging, which make it inaccurate. This leads to battery storage devices being overdimensioned compared to what is required by the performance and service life requirements, in order to ensure sufficient performance and thus be able to comply with liability and warranty commitments.

SUMMARY

The teachings of the present disclosure include systems and/or methods which make it possible to ascertain the state of health of battery cells in a simple and robust manner. For example, some embodiments include a method for ascertaining at least one average capacity loss of a battery storage device (2) comprising: a) Measurement of at least two load cycles (100) of the battery storage device (2) by means of a high precision coulometry apparatus (4), wherein a load cycle (100) comprises a first discharging during which a first quantity of charge (Q1) is measured from a first state of charge (21) to a second state of charge (22), a subsequent first charging during which a second quantity of charge (Q2) is measured from the second state of charge (22) to a third state of charge (23) and a second discharging during which a third quantity of charge (Q3) is measured from the third state of charge (23) to a fourth state of charge (24), wherein the charging and discharging of the load cycle (100) takes place between a lower voltage (26) and an upper voltage (25) of the battery storage device (2), b) Determination of a first charge displacement (d1) by means of a difference between the fourth state of charge (24) and the second state of charge (22) and determination of a second charge displacement (d2) by means of a difference between the third state of charge (23) and the first state of charge (21), c) Determination of a capacity loss (dKap) from the difference between the first charge displacement (d1) and the second charge displacement (d2), Performance of the steps a) to c) until the capacity loss (dKap) is almost constant in at least two consecutive load cycles (100), and Ascertainment of an average capacity loss ($dKap_{average}$) based on at least two capacity losses (dKap).

In some embodiments, a constant temperature prevails in each consecutive load cycle (100) within the load cycle.

In some embodiments, the high precision coulometry apparatus (4) is temperature-controlled in a temperature control chamber (3), with a conductive temperature controller and/or with a cooling apparatus.

In some embodiments, the lower voltage (26) is selected from a first voltage range and the upper voltage (25) is selected from a second voltage range of the battery storage device (2).

In some embodiments, the first voltage range and the second voltage range are selected from an entire working voltage range of the battery storage device (2).

In some embodiments, a residual capacity (CR) of the battery storage device is ascertained from the difference between a starting capacity (CS) and the average capacity loss ($dKap_{average}$).

In some embodiments, the residual capacity is determined on the basis of at least two average capacity losses ($dKap_{average}$).

In some embodiments, different conditions in the load cycle from a load spectrum are used for ascertaining the at least two average capacity losses ($dKap_{average}$) for each average capacity loss.

In some embodiments, the conditions of the load cycles of the load spectrum are selected as a function of a predefined battery operation and the ascertainment of the residual capacity (CR) represents a prediction of the residual capacity (CR) for battery operation or the residual capacity (CR) is included in a prediction of an aging behavior of the battery storage device (2) for battery operation.

In some embodiments, the method is computer-aided in a computing unit (10).

As another example, some embodiments include an apparatus (1) comprising: a high precision coulometry apparatus (4), wherein this is configured to record a load cycle (100) of the battery storage device (2) metrologically, wherein the load cycle (100) comprises a first discharging during which a first quantity of charge (Q1) is measured from a first state of charge (21) to a second state of charge (22), a subsequent first charging during which a second quantity of charge (02) is measured from the second state of charge (22) to a third state of charge (23) and a second discharging during which a third quantity of charge (Q3) is measured from the third state of charge (23) to a fourth state of charge (24), wherein the charging and discharging of the load cycle (100) takes place between a lower voltage (26) and an upper voltage (25) of the battery storage device (2), and a computing unit (10) configured to determine a first charge displacement (d1) by means of a difference between the fourth state of charge (24) and the second state of charge (22) and to determine a second charge displacement (d2) by means of a difference between the third state of charge (23) and the first state of charge (21), configured to determine a capacity loss (dKap) from the difference between the first charge displacement (d1) and the second charge displacement (d2), configured to ascertain an average capacity loss ($dKap_{average}$).

In some embodiments, the computing unit (100) is configured to ascertain the residual capacity (CR) from the difference between a starting capacity (CS) and at least one average capacity loss ($dKap_{average}$).

In some embodiments, the computing unit (10) is configured to determine the number (Z) of load cycles (100) based on the capacity losses (dKap) used to ascertain the average capacity loss ($dKap_{average}$).

In some embodiments, the apparatus further comprises a temperature control chamber (3) which is suitable for arranging the battery storage device.

As another example, some embodiments include a computer program product (13), which can be loaded directly into a storage facility of a programmable computing unit (10), having program code means for carrying out one or more of the methods described herein when the computer program product (13) is carried out in the computing unit (10).

BRIEF DESCRIPTION OF THE DRAWINGS

Further features, properties, and advantages of the teachings of the present disclosure will emerge from the description which follows with reference to the accompanying figures. In the figures, shown schematically.

DETAILED DESCRIPTION

Figure 1:
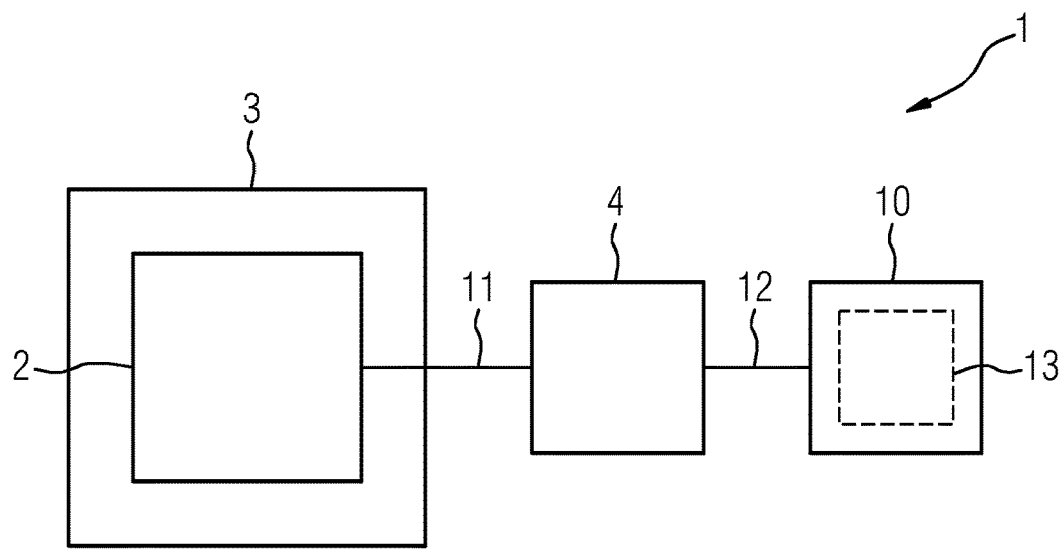
FIG. 1 shows an example apparatus incorporating teachings of the present disclosure for determining the average capacity loss and a residual capacity with a high precision coulometry apparatus.

Some embodiments of the teachings of the present disclosure include a method for ascertaining at least one average capacity loss of a battery storage device. In some examples, a) at least two load cycles of the battery storage device are measured by means of a high precision coulometry apparatus, wherein a single load cycle comprises a first discharging in which a first quantity of charge is measured from a first state of charge to a second state of charge. A subsequent first charging takes place, in which a second quantity of charge is measured from the second state of charge to a third state of charge. Subsequently, a second discharging takes place, in which a third quantity of charge is measured from the third state of charge to a fourth state of charge. Charging and discharging in the load cycle take place between a lower voltage and an upper voltage of the battery storage device. In a second step b), the determination of a first charge displacement by means of a difference between the fourth state of charge and the second state of charge and the determination of a second charge displacement by means of a difference between the third state of charge and the first state of charge. In a third step c), a capacity loss is determined from the difference between the first charge displacement and the second charge displacement, the first step a), the second step b) and the third step c) being performed until the capacity loss is substantially constant. Subsequently, the average capacity loss is ascertained based on at least two capacity losses.

As another example, some embodiments include an apparatus for performing a method for determining the average capacity loss of a battery storage device using a high precision coulometry apparatus. The high precision coulometry apparatus is configured to metrologically record a load cycle of the battery storage device. In this case, a first discharging is carried out within the load cycle, in which a first quantity of charge is measured from a first state of charge to a second state of charge. A subsequent first charging, in which a second quantity of charge takes place from the second state of charge to a third state of charge, is measured. Subsequently, a second discharging takes place, in which a third quantity of charge is measured from the third state of charge to a fourth state of charge. The charging and discharging in the load cycle take place between a lower voltage and an upper voltage of the battery storage device. The apparatus further comprises a computing unit which is configured to determine a first charge displacement by means of a difference between the fourth state of charge and the second state of charge. The computing unit is further configured to determine a second charge displacement by means of a difference between the third state of charge and the first state of charge. In addition, the computing unit is configured to determine a capacity loss from the difference between the first charge displacement and the second charge displacement and to determine an average capacity loss when the capacity loss is substantially constant. Furthermore, the computing unit is configured to ascertain the average capacity loss.

As another example, some embodiments include a computer program product that can be loaded directly into a storage facility of a programmable computing unit. It comprises program code means to execute one or more of the methods described herein when the computer program product is executed in the computing unit.

The average capacity loss describes the aging rate for a selected load cycle in the unit capacity loss per cycle. It is possible to carry out a quantitative evaluation of the measurement data of the high precision coulometry apparatus with regard to the aging rate of the battery. Quantitative evaluation is possible as absolute values for the capacity can be ascertained based on the determination of the average capacity loss.

Furthermore, it is possible to use non-symmetrical charging and discharging cycles, as well as high current strengths for a load cycle. In other words, it can be any load cycle, in particular a constant current profile, a constant performance profile, a transient current profile or a transient performance profile. The load cycle may also have pauses in which no current flows, for example at the reversal points defined by the voltage limits. The load cycle is only run through periodically and encounters two fixed voltage limits. The selection of the voltage limits defines a specific operating point, characterized by an average state of charge (SOC) and a cycle depth (DOD).

Furthermore, it is possible to determine states of health in a short time using the methods described herein. The product development of the electrochemical energy storage device or its application can thus be accelerated. This reduces the cost of product development. Furthermore, the utilization of the test equipment is reduced, which makes the development more efficient.

The capacity losses ascertained are considered to be almost constant if a slope of a tangent which has been adapted to the course of the capacity losses has a value of less than 10% of the average of the slopes of the last 10% of the measured capacity losses. Alternatively, the capacity losses are considered to be almost or substantially constant if an absolute change of at least two consecutive capacity losses (dKap) is, in particular, less than 5%.

The determination of the average capacity loss is computer-aided by a sliding linear fit via the values of the capacity loss and finding the smallest slopes in the straight-line equations generated in this way. Starting from a fit over all capacity losses, the data record, which comprises the ascertained capacity losses, is continuously shortened and a new straight line is fitted. The fit is carried out up to a certain minimum residual length of the data record, e.g. the capacity losses. Subsequently, the straight-line equations are sorted according to the values of their slopes in ascending order of magnitude. The measurement can then be considered valid if at least two of the slopes have a value of less than 10% of the average of the last 10% of the capacity losses in terms of magnitude. If, for example, the average of the last twenty capacity losses, in particular in the case of a measurement of at least 200 capacity losses, is 5 mAh/load cycle, then it should have a slope of the two best adapted tangents ("fits") less than 0.05 mAh/load cycle.

Capacity losses may be used to ascertain the residual capacity after a transient phase of the load cycle. Capacity losses which are ascertained at the beginning of the measurements, that is to say during the transient process, are error-prone and should therefore not be included in the ascertainment of the average capacity loss. It has been found that this transient phase is terminated when at least two of the straight lines applied to the capacity loss in a fitting have slopes of less than 10% of the average value of the last 10% of the measured capacity losses. Alternatively, the capacity losses are considered to be almost constant if two consecutive capacity losses and/or a moving average over at least 20 capacity losses show a change of less than 5% as a capacity loss. This procedure ensures that the ascertainment of the residual capacity based on the capacity loss can be performed quickly and nonetheless reliably.

In some embodiments, a constant temperature prevails in each successive load cycle within a determination of the capacity loss. In other words, this means that the temperature may be different in two consecutive determinations of the capacity loss. However, the temperature during a load cycle is constant. Load cycles can thus be combined for determining the average capacity loss, which were each recorded at different temperatures, as long as the temperature has remained constant within a load cycle.

In some embodiments, the battery or battery cell is operated in a temperature control chamber. The battery or battery cell is arranged in a temperature control chamber in this embodiment. In particular, the temperature control chamber makes it possible to ensure sufficiently high temperature stability during a load cycle of the battery. Alternatively, it is possible to stabilize the temperature of the battery storage device, which goes through the load cycle, by means of a contacted temperature controller and/or a cooling circuit. The use of a temperature control ensures that the temperature remains constant during a determination of the capacity loss. This increases the reliability of the determination of the residual capacity of the battery storage device.

It is possible to use any temperature of the permitted working range for measuring a load cycle. A determination of a single capacity loss does not have to be carried out under standard conditions.

In some embodiments, the lower voltage is selected from a first voltage range and the upper voltage from a second voltage range. The second voltage range is expediently at higher voltages than the first voltage range. Both the first voltage range and the second voltage range can be selected from the entire working voltage range of the battery storage device. In other words, no full cycles need to be performed. It is therefore possible to use the permitted voltage range of the battery storage device according to the product sheet or beyond. Measuring the capacity loss without performing full cycles, that is to say full charging and discharging, enables a shorter measurement duration. Furthermore, the battery storage device is less heavily loaded by the measurement, which may prevent rapid aging.

In some embodiments, at least two capacity losses are selected and averaged for the ascertainment of the residual capacity and multiplied by the number of selected load cycles. In some embodiments, the moving average for the determination of the average capacity loss is ascertained from at least 20 capacity losses.

In some embodiments, a residual capacity of the battery storage device based on the difference between a starting capacity and the average capacity loss is ascertained. This residual capacity can be compared with a reference residual capacity. This enables validation of the selected properties of the load profile and the evaluation. Furthermore, the residual capacity represents a value on the basis of which various battery storage devices can be directly compared with one another. This enables two battery storage devices from different manufacturers to be operated with the same load profile. On the basis of the ascertained residual capacity, the aging behavior of the different battery storage devices can be inferred and a selection for a predefined application, which maps the load profile, can thus be made.

In some embodiments, the residual capacity is determined on the basis of at least two average capacity losses. Different conditions in the load cycle may be selected from a load spectrum for the ascertainment of the average capacity losses. In other words, this means that the method is performed with a first load profile and with a second load profile, which differs from the first load profile. For the first and second load profile, a first and a second average capacity loss is determined in each case. Based on the at least two average capacity losses, a residual capacity is then determined. This determination can be carried out for two different battery storage devices, in particular different specifications and/or different manufacturers. For a planned use which is similar or equal to the combination of the two load profiles, the optimum battery storage can thus be ascertained.

A spectrum which has at least two different load profiles is considered to be a load spectrum.

In some embodiments, the conditions of the load cycles of the load spectrum are selected as a function of a predefined battery operation. The ascertainment of the residual capacity then represents a prediction of the residual capacity for battery operation. In some embodiments, the residual capacity can be included in a prediction of an aging behavior of the battery storage device for battery operation. In some embodiments, the load spectrum is defined in such a way that it reflects the stress on the battery storage device in the specific battery operation, for example use in an electric vehicle or as a home storage device.

If an average value is used for the ascertainment of the residual capacity, the reliability of the determination of the residual capacity may be increased.

In some embodiments, the method for ascertaining an average capacity loss is carried out in a computer-aided manner in a computing unit. In some embodiments, the measuring method can thus be automated, which accelerates the evaluation. The product development of the electrochemical energy storage device or its application can thus be accelerated. This reduces the cost of product development. Furthermore, the utilization of the test equipment is reduced, which makes development more efficient.

In some embodiments, the computing unit is configured to determine the number of load cycles based on the selection of the capacity losses. In other words, the computing unit can also determine the average capacity loss if an average value is obtained over at least two capacity losses.

In some embodiments, while the load cycle is being measured, the computing unit is configured to ascertain whether an almost constant value of the capacity loss has already been reached and to initiate a further load cycle of the battery storage device as a function of the result of the evaluation. It is possible to perform the ascertainment of the residual capacity in an automated manner.

FIG. 1 shows an example apparatus incorporating teachings of the present disclosure for determining the average capacity loss and the residual capacity with a high precision coulometry apparatus 1. The apparatus 1 comprises a battery storage device 2, wherein the battery storage device has at least one battery cell. The battery storage device is arranged in a temperature control chamber 3. The battery storage device 2 is connected to a high precision coulometry apparatus 4 via a power cable 11. The high precision coulometry apparatus 4 is in turn connected to a computing unit 10 via a data cable 12. The high precision coulometry apparatus 4 records a charge-time diagram of the battery storage device 2 with very great accuracy. The battery storage device 2 is operated with a periodic load cycle 100.

Figure 2:
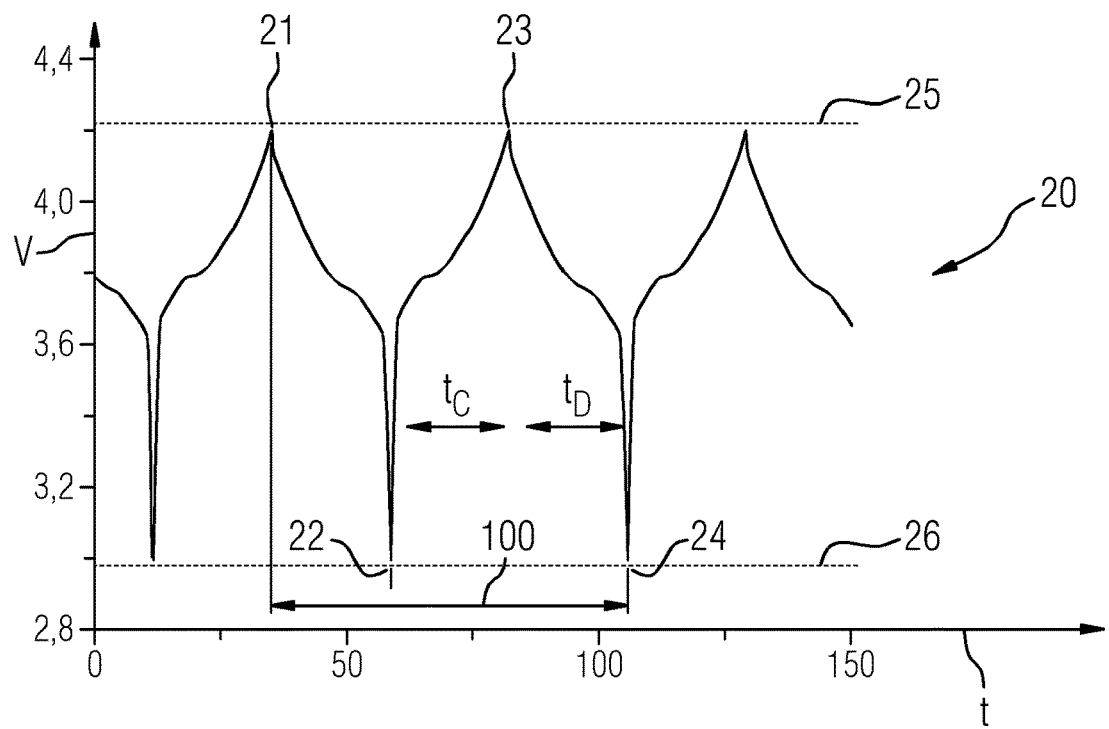
FIG. 2 shows a voltage-time diagram of a load cycle.

FIG. 2 is a chart showing a voltage-time diagram recorded by the high precision coulometry apparatus 4 during a periodic load cycle 100 of the battery storage device 2. A load cycle 100 includes discharging from a first state of charge 21 to a second state of charge 22, the first state of charge 21 being at an upper voltage 25 and the second state of charge 22 being at a lower voltage 26. Subsequently, in the load cycle 100, the battery storage device 2 is charged from the second state of charge 22 to a third state of charge 23. As a next step, in the load cycle 100, the third state of charge 23 is discharged to a fourth state of charge 24. In each individual charging/discharging step, an upper voltage 25 and a lower voltage 26 are maintained as voltage limits. Charging takes the charging period $t_C$. Discharging takes the discharging period $t_D$.

Figure 3:
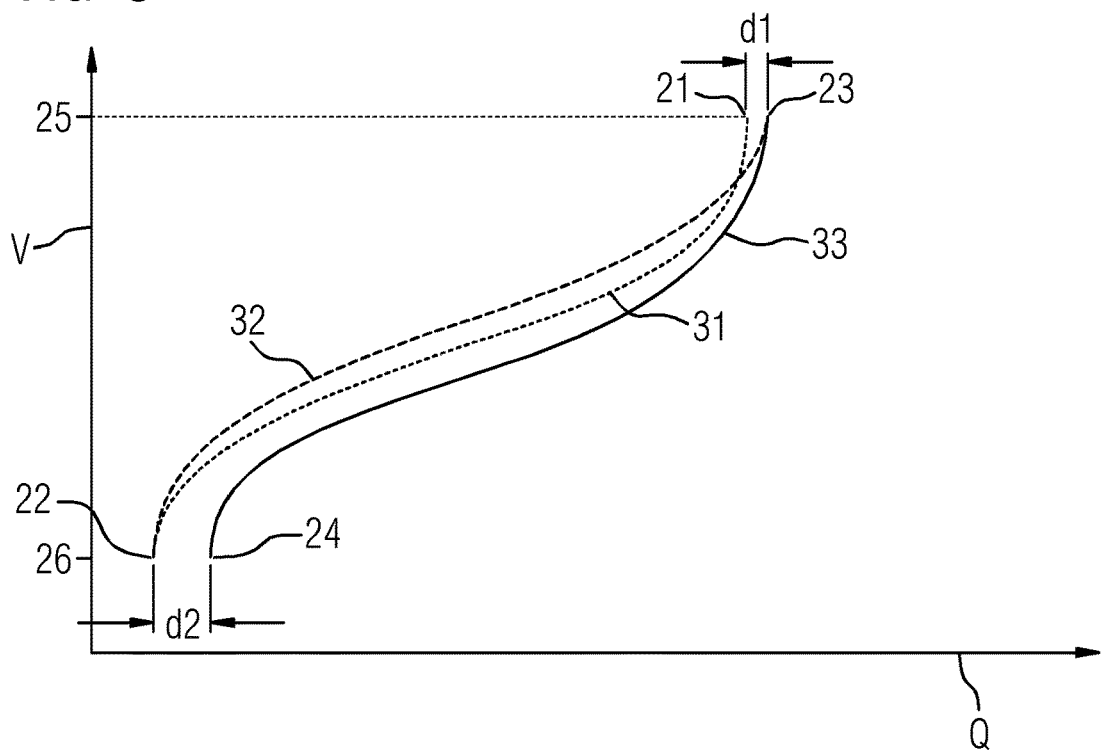
FIG. 3 shows a voltage-charge diagram of a load cycle.

Based on the measurement shown in FIG. 2, it can now be ascertained, as shown in FIG. 3, which cumulative quantity of charge has flowed in the individual charging and discharging steps.

FIG. 3 shows a diagram in which the voltage of the battery storage device is plotted against the cumulative quantity of charge Q. The load cycle 100 in turn begins at the first state of charge 21. The battery storage device 2 is discharged to the second state of charge 22 during the first discharge 31. In this case, a first quantity of charge Q1 is removed from the battery storage device 2. The first quantity of charge Q1 can be calculated via equation 1, wherein I denotes the current flow and $t_D$ denotes the discharge period:

$$Q1 = \int I \, dt_D \qquad \text{Equation 1}$$

Within the load cycle 100, the battery storage device 2 is subsequently charged from the second state of charge 22 to the third state of charge 23 by means of a first charging 32. A second quantity of charge Q2 is loaded into the battery storage device 2. Q2 can be calculated by means of equation 2:

$$Q2 = \int I \, dt_C \qquad \text{Equation 2}$$

Within the load cycle 100, the battery storage device 2 is subsequently discharged from the third state of charge 23 to the fourth state of charge 24 by means of a second discharge 33. The quantity of charge Q3 removed can in turn be calculated analogously to equation 1 from the period of discharge to the associated current flow.

Now it is possible to ascertain a first charge displacement d1 between the first state of charge 21 and the third state of charge 23. Furthermore, a second charge displacement d2 can be ascertained between the second state of charge 22 and the fourth state of charge 24. From the difference between the first charge displacement d1 and the second charge displacement d2, a capacity loss dKap for the load cycle 100 can now be ascertained by means of equation 3.

$$dKap = d2 - d1 \qquad \text{Equation 3}$$

Figure 4:
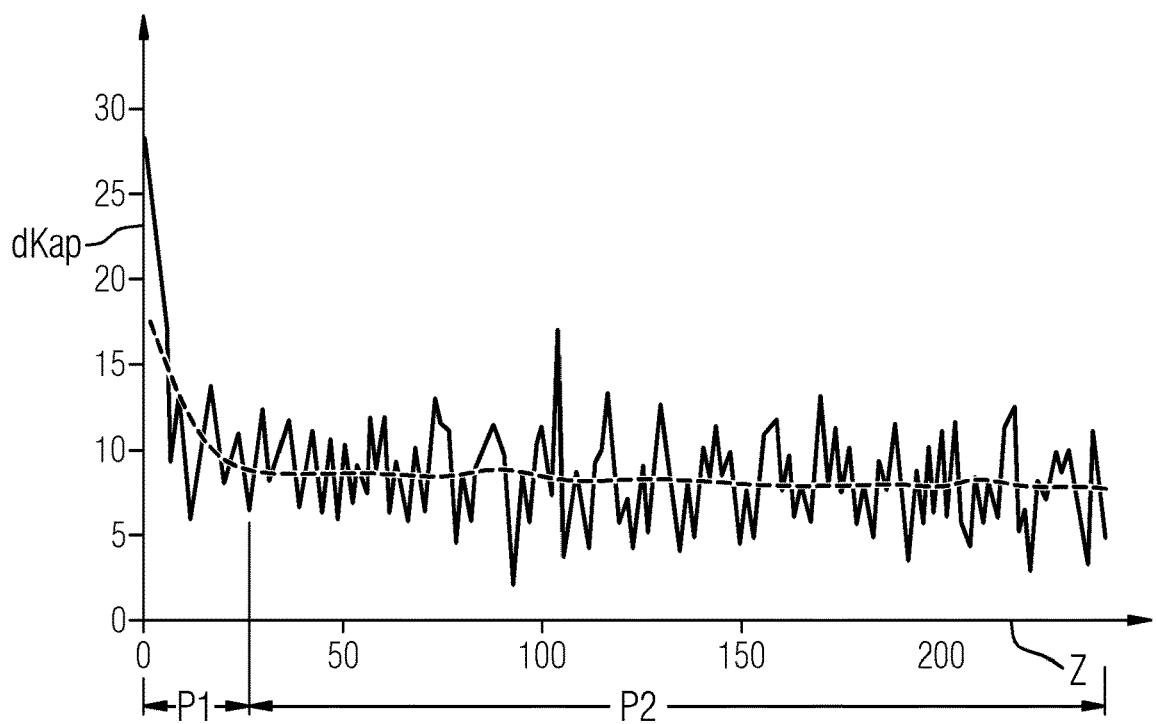
FIG. 4 shows a capacity loss per cycle–cycle number diagram of at least 200 load cycles.

FIG. 4 now shows the capacity loss per load cycle for 250 load cycles. The load cycle number Z, that is to say the current number of the respective load cycle 100, is located on the x-axis, and the capacity loss dKap per load cycle 100 is located on the y-axis. FIG. 4 illustrates that initially a transient phase P1 occurs during the successive load cycles 100. The length of the transient phase P1 is dependent on the operating point and the history of the battery storage device or the battery cell. The transient phase P1 can be reduced, for example, by performing the measurement of the subsequent operating point at the same average state of charge (SOC) as the preceding measurement.

The determination of the average capacity loss $dKap_{average}$ as a measured value of the method is carried out by a sliding linear fit via the values of the capacity loss dKap and the determination of the smallest slopes in the straight-line equations produced in this way. Starting from a fit over all values of the capacity loss dKap, that is to say, for example, value 1 to value 250, the data record is continuously shortened and a new straight line is generated (fitted) (2 to 250, 3 to 250, etc.). The fit is performed up to a certain minimum residual length of the data record, for example 10% of the total length. Subsequently, the straight-line equations are sorted in ascending order of magnitude, in particular according to the values of their slopes. The measurement can then be considered valid if at least two of the slopes have a value of less than 10% of the average of the last 10% of the capacity losses dKap. For example, if the average of the last twenty capacity losses, in particular in the case of a measurement of at least 200 capacity losses, is 5 mAh/load cycle, then it should have a slope of the two best adapted tangents ("fits") less than 0.05 mAh/load cycle.

Otherwise, the measurement is to be repeated, in particular with a greater number of support points, because a sufficiently steady state of the system has not been achieved. A certain number, for example, rounded 3% of the total length of the data record, or a minimum number of two measured values, is selected from the sorting, and the corresponding starting indices of the fitted straight lines are ascertained. For each of the sections ascertained in this way, an averaged capacity loss is specified as an arithmetic mean over the included capacity losses dKap. The value of the average capacity loss $dKap_{average}$ is then determined as an average value over the averaged individual capacity losses.

If a sufficiently steady-state, that is to say essentially constant, capacity loss has not yet been achieved, the measurement of the load cycle is repeated. From the sorting, a certain number, for example, rounded 3% of the total length of the data record, or a minimum number of two, is then in turn selected, and the corresponding starting indices of the fitted straight lines are ascertained. For each of the sections ascertained in this way, the average capacity loss $dKap_{average}$ is specified as an arithmetic mean over the included capacity losses. However, the value of the average capacity loss $dKap_{average}$ can also be determined as an average over the arithmetically averaged capacity losses.

FIG. 4 also illustrates that an ascertainment phase P2 follows the transient phase P1. These phases can shift during the evaluation of the capacity losses dKap. Based on the average capacity loss dKap, it is now possible to determine a residual capacity CR and thus to make a prediction for the load profile used to predict an aging behavior of the examined battery storage device under the conditions of the load cycle. The average capacity loss $dKap_{average}$ may be used to ascertain the residual capacity. The average capacity loss $dKap_{average}$ is multiplied by the number of load cycles included in the evaluation and subtracted from the starting capacity CS. This results in the residual capacity CR, as shown in equation 4.

$$CR = CS - Z \cdot dKap_{average} \qquad \text{Equation 4}$$

Figure 5:
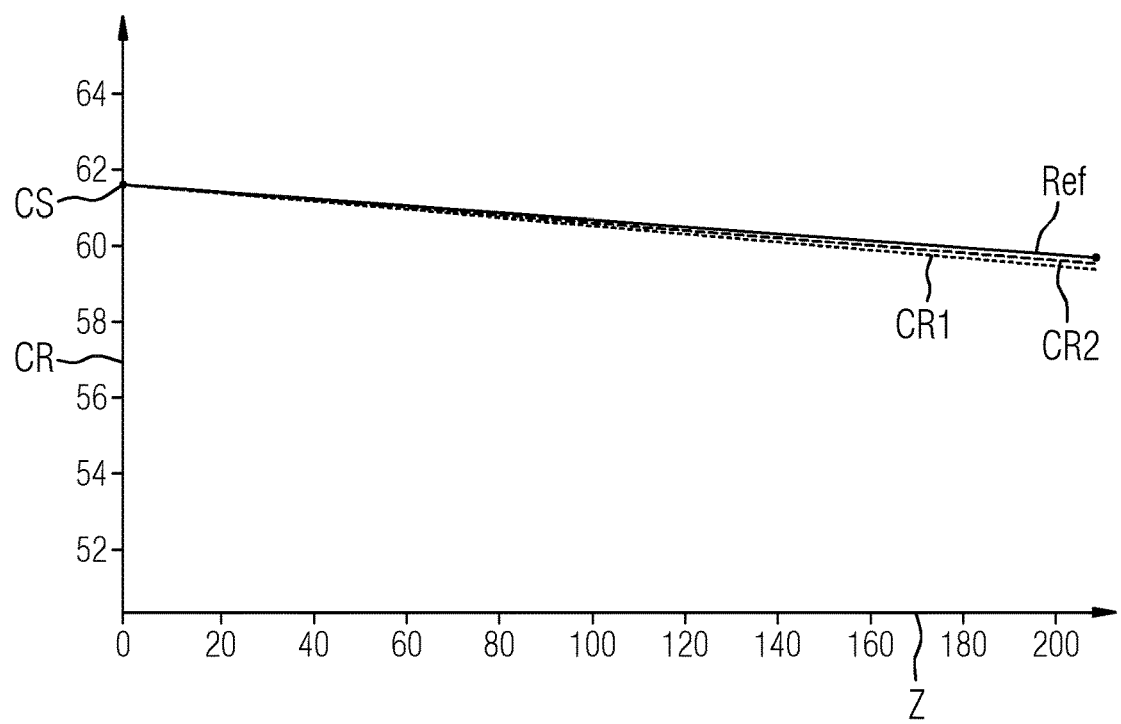
FIG. 5 shows a residual capacity–cycle number diagram of at least 200 load cycles.

FIG. 5 is a diagram showing the calculated residual capacity CR over the load cycle number Z. Before the first load cycle, the starting capacity CS can also be read from this diagram. The diagram shown in FIG. 5 shows the residual capacity CR, which is based on three different data records of the capacity losses dKap. In the first ascertained residual capacity CR 1, a first cycle number of load cycle numbers 42 to 241 was selected. In the second ascertained residual capacity CR2, a second cycle number of load cycle numbers 162 to 241 was included in the ascertainment. The reference capacity Ref and the starting capacity CS were ascertained by means of a standard capacity test according to the specifications of the cell manufacturer. The comparison of the ascertained remaining capacities CR1, CR2 and Ref shows that the first residual capacity CR1 and the second residual capacity CR2 exhibit a high correspondence with the reference residual capacity Ref. The quality of the determination of the residual capacity increases with continuous shortening of the support points included in the determination of $dKap_{average}$.

FIG. 5 makes it clear that the residual capacity can be reliably ascertained based on the load cycles and their evaluation. Thus, based on high precision coulometry measurements, a quantitative determination of the capacity of the battery storage device 2 for the load profiles used can be carried out. By selecting the load profiles from a load profile spectrum for a defined battery operation, this determination can be seen as a prediction of the (residual) capacity of the battery storage device for the defined battery operation. This enables, in particular, the selection of a battery storage device for a defined application of the battery storage device, in particular in an electric vehicle, an electric train or a home storage device.

Furthermore, the measurement method can also be used for asymmetrical charging or discharging currents and at any desired high current intensities. The method is independent of influences, in particular such as that of the anode overhang. A load cycle 100 furthermore does not have to represent a full cycle of the battery storage device 2.

Figure 6:
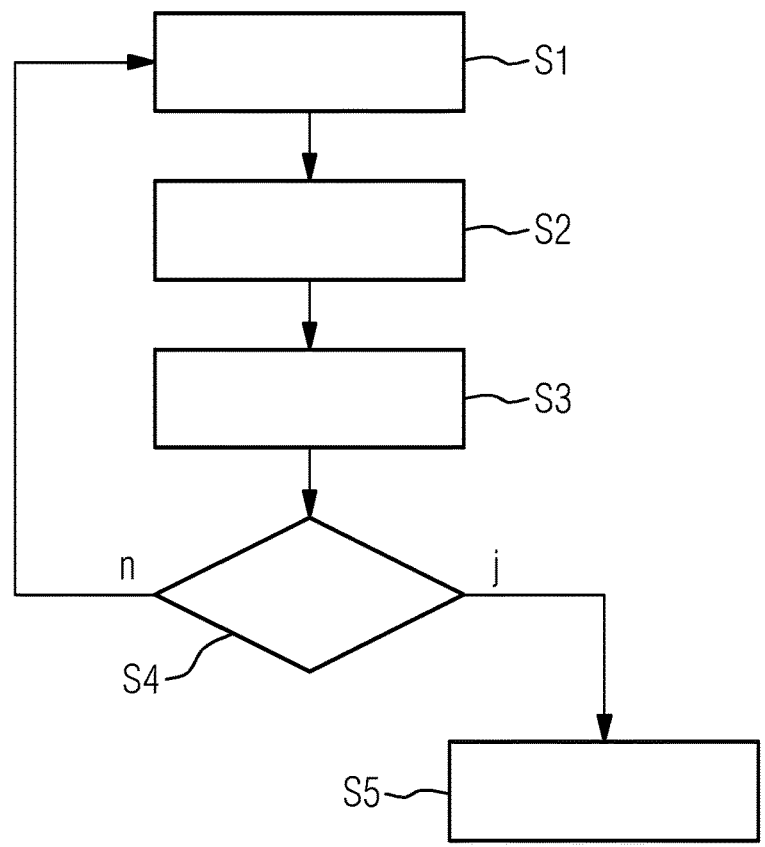
FIG. 6 is a flowchart showing an example method incorporating teachings of the present disclosure for determining the average capacity loss of the residual capacity of the battery storage device.

FIG. 6 is a flowchart illustrating an example method incorporating teachings of the present disclosure for determining the average capacity loss $dKap_{average}$ and the residual capacity CR of a battery storage device 2. In a first step S1, at least ten load cycles of the battery storage device are measured by means of a high precision coulometry apparatus. A load cycle comprises a first discharging, a first charging and a second discharging. In a second step S2, the charge displacements are determined. In a third step S3, a capacity loss is determined based on the charge displacements. In a fourth step S4, the capacity loss is checked for constancy. If the at least two capacity losses are not considered to be constant, then a further load cycle is started beginning with step S1. If the at least two capacity losses are considered to be constant, the average capacity loss $dKap_{average}$ for the measured operating point, that is to say the defined load profile, is specified in a fifth step S5. The measurement result can then be used, in particular together with the results for further operating points, or load profiles, for example for the design or modelling of a battery storage device.

Although the teachings herein have been illustrated and described in more detail by the exemplary embodiments, the scope of the disclosure is not limited by the disclosed examples. Variations thereof may be derived by a person skilled in the art without departing from the scope of the disclosure as defined by the following claims.

LIST OF REFERENCE CHARACTERS

1 Apparatus for predicting residual capacity
2 Battery storage device
3 Temperature control chamber
4 High precision coulometry apparatus
10 Computing unit
11 Power cable
12 Data cable
13 Computer program product
21 First state of charge
22 Second state of charge
23 Third state of charge
24 Fourth state of charge
25 Lower voltage
26 Upper voltage
31 First discharging
32 First charging
33 Second discharging
100 Load cycle t Time
$t_C$ Charging period
$t_D$ Discharging period
V Voltage
Q Charge
CR Residual capacity
CS Starting capacity
d1 First charge displacement
d2 Second charge displacement
Z Load cycle number
dKap Capacity loss per load cycle
P1 Transient phase
P2 Ascertainment phase
S1 Measurement of a load cycle
S2 Determination of a first and second charge displacement
S3 Determination of a capacity loss
S4 Checking of at least two capacity losses for constancy
S5 Ascertainment of the average capacity loss and the residual capacity

What is claimed is:

1. A method for ascertaining at least one average capacity loss of a battery storage device, the method comprising:
measuring at least two load cycles of the battery storage device using a high precision coulometry apparatus, wherein a load cycle includes a first discharging during which a first quantity of charge is a difference between a first state of charge and a second state of charge, a subsequent first charging during which a second quantity of charge is a difference between the second state of charge and a third state of charge, and a second discharging during which a third quantity of charge is a difference between the third state of charge and a fourth state of charge, wherein the charging and discharging of the load cycle takes place between a lower voltage and an upper voltage of the battery storage device;
determining a first charge displacement using a difference between the fourth state of charge and the second state of charge and a second charge displacement using a difference between the third state of charge and the first state of charge;
determining a capacity loss equal to the difference between the first charge displacement and the second charge displacement;
repeatedly measuring load cycles until the capacity loss is almost constant in at least two consecutive load cycles; and
ascertaining an average capacity loss based on at least two capacity losses.

2. The method as claimed in claim 1, wherein a constant temperature prevails in each consecutive load cycle within the at least two load cycles.

3. The method as claimed in claim 1, wherein the high precision coulometry apparatus is temperature-controlled in a temperature control chamber with a conductive temperature controller and/or with a cooling apparatus.

4. The method as claimed in claim 1, wherein the lower voltage is selected from a first voltage range and the upper voltage is selected from a second voltage range of the battery storage device.

5. The method as claimed in claim 4, wherein the first voltage range and the second voltage range are selected from an entire working voltage range of the battery storage device.

6. The method as claimed in claim 1, further comprising ascertaining a residual capacity of the battery storage device equal to a difference between a starting capacity and the average capacity loss.

7. The method as claimed in claim 6, further comprising determining the residual capacity using at least two average capacity losses.

8. The method as claimed in claim 7, further comprising using different conditions in the load cycle from a load spectrum for ascertaining the at least two average capacity losses for each average capacity loss.

9. The method as claimed in claim 8, wherein:
the conditions of the load cycles of the load spectrum are selected as a function of a predefined battery operation; and
the ascertainment of the residual capacity represents a prediction of the residual capacity for battery operation or the residual capacity is included in a prediction of an aging behavior of the battery storage device for battery operation.

10. An apparatus comprising:
a high precision coulometry apparatus configured to record a load cycle of a battery storage device metrologically, wherein the load cycle comprises a first discharging during which a first quantity of charge is measured from a first state of charge to a second state of charge, a subsequent first charging during which a second quantity of charge is measured from the second state of charge to a third state of charge and a second discharging during which a third quantity of charge is measured from the third state of charge to a fourth state of charge, wherein the charging and discharging of the load cycle takes place between a lower voltage and an upper voltage of the battery storage device;
a computing unit programmed to determine a first charge displacement equal to a difference between the fourth state of charge and the second state of charge, a second charge displacement equal to a difference between the third state of charge and the first state of charge, a capacity loss from the difference between the first charge displacement and the second charge displacement, and configured to ascertain an average capacity loss.

11. The apparatus as claimed in claim 10, wherein the computing unit is further configured to ascertain the residual capacity from the difference between a starting capacity and at least one average capacity loss.

12. The apparatus as claimed in claim 10, wherein the computing unit is further configured to determine the number of load cycles based on the capacity losses used to ascertain the average capacity loss.

13. The apparatus as claimed in claim 10, further comprising a temperature control chamber for arranging the battery storage device.

* * * * *